Dec. 25, 1951       H. G. CORNEIL                   2,580,004
           REMOVAL OF IRON FROM REGENERATED
              CRACKING CATALYST FINES
                 Filed Feb. 6, 1950
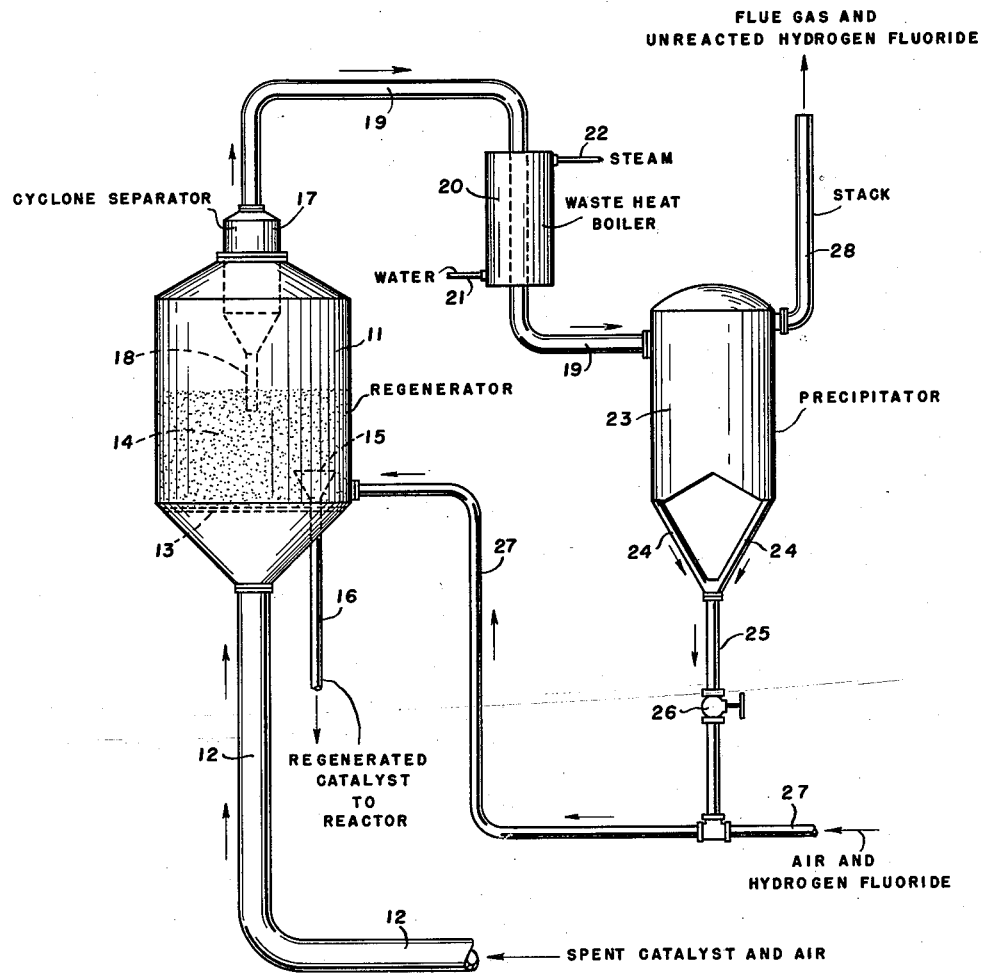
INVENTOR.
Hampton G. Corneil,
BY
AGENT.

Patented Dec. 25, 1951

2,580,004

UNITED STATES PATENT OFFICE 2,580,004

REMOVAL OF IRON FROM REGENERATED CRACKING CATALYST FINES

Hampton G. Corneil, Baytown, Tex., assignor, by mesne assignments, to Standard Oil Development Company, Elizabeth, N. J., a corporation of Delaware Application February 6, 1950, Serial No. 142,657

9 Claims. (Cl. 252—415)

1

The present invention involves contacting with hydrogen fluoride the finely divided catalyst particles employed as a catalyst in the cracking of hydrocarbons.

The invention particularly concerns a cracking process involving a cracking zone and a regeneration zone in which the catalyst is circulated from the cracking zone to the regeneration zone and from the regeneration zone to the cracking zone. The catalyst circulated in the aforementioned system has particle diameters ranging from about 0 to 200 microns. In the regeneration zone the catalyst which has become fouled with carbonaceous and coke-like deposits is subjected to a hot combustion gas such as air at a temperature in the range between 850° and 1200° F. and the combustion products including finely divided catalyst particles, the major portion having diameters in the range between 0 and 40 microns are separated from the catalyst, cooled by passage through a heat exchanger and then subjected to a final recovery step such as an electrical precipitator to separate and recover the finely divided particles from the combustion products which are discarded. The finely divided particles, in accordance with the present invention, are admixed with air and hydrogen fluoride at a temperature in the range between 400° and 700° F. and returned to the regenerator. By admixing or contacting the catalyst particles, having the diameters mentioned before, with hydrogen fluoride, it is possible to treat the catalyst particles and overcome the undesirable effects caused by contaminating metallic bodies present on the catalyst particles.

It has been observed that in a system such as described before wherein catalyst is circulated, the catalyst particles pick up metallic contaminants from the feed hydrocarbons and also from the interior surfaces of the vessels which it contacts in the system; since the vessels are predominantly constructed of iron, the catalyst particles become contaminated with iron and this iron has been found to affect deleteriously the cracking reaction, promoting the formation of carbon and gaseous products and thus affecting deleteriously the production of desired reaction products from the hydrocarbon being cracked. Not only does the presence of iron affect deleteriously the formation of desired

2 products, but also the catalyst activity is adversely affected.

The contaminants such as iron and the like have been found to be concentrated in and on the catalyst particles, the major portion of which have diameters in the range between 0 and 40 microns. To exemplify the concentration of iron on these catalyst particles of which a major portion has diameters in the range between 0 and 40 microns and hereinafter referred to as fines, the following comparison is given between the average catalyst and the catalyst fines:

TABLE I

|  | Average Catalyst | Catalyst Fines |
|---|---|---|
| Iron Content, Wt. Per Cent $Fe_2O_3$ | 0.29 | 0.45 |
| Catalyst Activity, Per Cent D+L at 400° F | 29.1 | 25.5 |
| Catalyst Quality, Gas producing factor | 1.36 | 2.09 |
| Catalyst Quality, Carbon producing factor | 1.34 | 1.79 |

The catalyst compared in Table I was obtained from a commercial cracking unit charging in excess of 30,000 barrels of feed stock per day. It will be clear that the catalyst fines have nearly twice as much iron as the oxide on a weight percent basis as the average catalyst. Furthermore, it will be apparent that the catalyst activity and quality of the fines are substantially less than that of the average catalyst.

The measure of catalyst activity and quality as shown by percent D+L at 400° F., gas producing factor, and carbon producing factor is commercially used in the cracking industry. A complete discussion and description of these expressions may be found in U. S. 2,488,718 issued November 22, 1949, to Robert A. Forrester.

Thus, the present invention, by treating only the fines with hydrogen fluoride, allows the fines to be treated more severely than if the total regenerated catalyst were treated.

The circulating catalyst, which may be silica-alumina, silica-zirconia, silica-magnesia, alumina, or magnesia or mixtures thereof, as mentioned before, will have particle diameters in the range from 0 to 200 microns.

An analysis of a typical circulating catalyst shows the major portion of the catalyst to have particle diameters in the range from 40 to 200 microns (mu) as presented in Table II:

TABLE II

Circulating catalyst

| | Per cent |
|---|---|
| 0– 20 mu | 3 |
| 20– 40 mu | 13 |
| 40– 80 mu | 43 |
| 80–200 mu | 41 |
| | 100 |

The catalyst fines, on the other hand, are also composed of particles having diameters in the range between 0 and 200 microns, but the major portion of the catalyst fines are particles having diameters in the range from 0 to 40 microns, as shown by an analysis of typical catalyst fines in Table III:

TABLE III

Catalyst fines

| | Per cent |
|---|---|
| 0–20 mu | 31 |
| 20–40 mu | 39 |
| 40–80 mu | 20 |
| 80–200 mu | 10 |
| | 100 |

In short, the catalyst fines may be composed of particles the major portion of which have diameters in the range from 0 to 40 microns.

In practicing the present invention it will be desirable to cool the stream of combustion products, including the catalyst fines having diameters as shown, to a temperature in the range between 400° and 700° F. with a preferred temperature in the range between 400° and 500° F. The catalyst particles are separated from the combustion products and then treated with hydrogen fluoride, if desired, in admixture with a combustion supporting gas such as air, admixtures of nitrogen and oxygen and the like, or in admixture with an inert gasiform material. By virtue of treating only the fines which comprise only a small percentage of the catalyst particles, it is possible to treat this material severely with the same amount of hydrogen fluoride which ordinarily would be employed to treat the total regenerated catalyst and thus obtain vastly improved results.

The amount of hydrogen fluoride employed to treat the catalyst fines will ordinarily be in the range between 0.5 and 40 pounds per day per ton of catalyst in the circulating system including the regeneration and cracking zones. In a commercial cracking unit having a charge rate of 35,000 barrels per day the amount of catalyst circulated may be about 400 tons. Twenty pounds of hydrogen fluoride per ton of catalyst gives satisfactory results.

The hydrogen fluoride used in the practice of the present invention may be employed either in the anhydrous condition or as an aqueous solution. Actually it is immaterial, as to what condition the hydrogen fluoride is in, because water in some form or other is present in the system to which the hydrogen fluoride is added.

The present invention will be further illustrated by reference to the drawing in which a preferred mode thereof is described.

Turning now to the drawing, numeral 11 designates a regenerator of a fluidized catalytic cracking system. The reactor is not shown, but it is understood that the system will embody a reactor and also various separation and fractionation systems which are not shown for briefness of the description. A complete arrangement of a catalytic cracking unit including the cracking and regeneration zones is well known to the art and is shown in U. S. Patent 2,407,374, filed August 1, 1944, in the name of Conrad H. Kollenberg and entitled "Catalytic Cracking Process."

The regenerator 11 is provided with an inlet line 12 by way of which spent catalyst from the reactor, not shown, and a combustion supporting gas, such as air, is introduced thereto. The reactor 11 is provided with a grid plate 13 above which is maintained by adjustment of velocity in regenerator 11 a dense phase of catalyst indicated by the shaded portion 14. In regenerator 11 the catalyst in dense phase 14 in admixture with air or other combustion supporting medium is regenerated by burning off the contaminating cokey bodies and then may be reused in the cracking process, the regenerated catalyst being withdrawn from regenerator 11 by funnel shaped member 15 which connects into line 16 through which the regenerated catalyst is returned to the reactor not shown in the drawing.

Products of combustion leave the regenerator 11 by way of cyclone separator or separators 17 wherein a separation is made of the major portion of the catalyst from the combustion products, these catalyst particles being returned to the dense phase 14 by dip leg 18.

The combustion products carrying catalyst fines discharge from regenerator 11 by way of conduit 19 in which is located a heat exchanger apparatus illustrated by waste heat boiler 20. A major portion of the heat contained in the stream flowing through line 19 is thus recovered in waste heat boiler 20 into which water is added by line 21 and steam is withdrawn by line 22 for use in the process or elsewhere as may be desired. The waste heat boiler cools the products of combustion including entrained catalyst fines to a temperature in the range between 400° and 700° F. and preferably in the range between 400° and 500° F. In a commercial unit the temperature will ordinarily be 450° F. The cooled products of combustion and catalyst particles discharge by line 19 into an electrical precipitator 23 which may be one of the Cottrell type wherein the catalyst fines are separated from the combustion products and recovered. The catalyst particles, termed catalyst fines, are discharged from Cottrell precipitator 23 by dual lines 24 which converge into line 25 controlled by valve 26 which introduces the catalyst particles into line 27 for reintroduction into regenerator 11. In line 27 the catalyst particles withdrawn from precipitator 23 by line 25 are admixed with a mixture of air and hydrogen fluoride such that the catalyst particles are contacted under relatively severe conditions with hydrogen fluoride in line 27 prior to recycling to regenerator 11. By virtue of introducing hydrogen fluoride into line 27 it is possible to contact and/or treat the catalyst particles which have concentrated in and on them the iron picked up in the system to cause conversion of the iron to compounds which do not affect the catalyst quality and activity.

To illustrate the desirability of treating separately the catalyst fines with hydrogen fluoride a comparison is given in Table IV which shows the severity of treatment obtainable by adding the same amount of hydrogen fluoride to the regenerator through the catalyst return line as proposed in the present invention.

TABLE IV

|  | HF Added to Regenerator Directly | HF Added to Regenerator Thru Catalyst Return Line |
|---|---|---|
| Temperature of Catalyst at Point of HF Addition, °F | 1140 | 425 |
| Pressure on System at Point of HF Addition, pounds per square inch gauge | 7 | 11 |
| Mol per cent HF in the Treating Gas at Point of HF Addition when Adding 1 pound HF/Day per 100 pounds Catalyst Inventory | 0.196 | 5.02 |
| Partial Pressure of HF in the Treating Gas at Point of HF Addition when Adding 1 pound HF/Day per pound Catalyst Inventory, pounds per square inch absolute | 0.0432 | 1.31 |

It will be seen from the data in Table IV that it is possible to treat the catalyst fines at a much lower temperature than when adding hydrogen fluoride directly to the regenerator, and also under a much higher partial pressure. It is also noteworthy that the mol percent of the hydrogen fluoride contacting the catalyst fines is twenty-fivefold of that contacting the total catalyst when the hydrogen fluoride is added directly to the regenerator. Furthermore, the partial pressure of the hydrogen fluoride in the treating gas when employed in the practice of the present invention is thirtyfold of that possible when the hydrogen fluoride is added to the regenerator. The lower catalyst temperature and the higher hydrogen fluoride partial pressure possible when adding hydrogen fluoride in accordance with the present invention to contact the catalyst fines allows the hydrogen fluoride absorption by the catalyst to be increased and enables the hydrogen fluoride to react with the iron and the like metal contaminants to improve catalyst activity and quality.

It is also noteworthy that the hydrogen fluoride which is not needed to react with the contaminants finds its way into the regenerator 11 and may contact the total catalyst and finally is discharged by line 19 into Cottrell precipitator 23 and thence through stack 28 where the flue gas is discharged from the system.

It will be seen that not only are the catalyst fines treated selectively and preferentially, but also the hydrogen fluoride may be employed to treat the total catalyst and the hydrogen fluoride eliminated directly from the system without requiring expensive separation apparatus.

Although the present invention contemplates that the hydrogen fluoride will contact the catalyst fines in the equivalent of line 27, it is within the spirit and purview of my invention to contact the catalyst fines in a separate vessel if desired. For example, it might be desirable to increase the contact time of the Cottrell fines with treating gas and under these conditions a separate vessel might be desirable.

The nature and objects of the present invention having been completely described and illustrated, what I wish to claim as new and useful and to secure by Letters Patent is:

1. In a catalyst regeneration process in which a finely divided catalyst having particle diameters in the range between 0 and 200 microns is circulated from a regeneration zone to a cracking zone and from the cracking zone to the regeneration zone and wherein catalyst is subjected to a hot combustion supporting gas at a temperature no greater than 1200° F. in said regeneration zone and catalyst fines having a major portion comprising particle diameters in the range from 0 to 40 microns are discarded from said regeneration zone, the steps of recovering said catalyst fines, contacting said recovered catalyst fines at a temperature in the range between 400° to 700° F. with hydrogen fluoride and introducing said contacted fines and hydrogen fluoride into said regeneration zone.

2. In a catalyst regeneration process in which a finely divided catalyst having particle diameters in the range between 0 and 200 microns is circulated from a regeneration zone to a cracking zone and from the cracking zone to the regeneration zone and wherein catalyst is subjected to a hot combustion supporting gas in said regeneration zone at a temperature in the range between 850° and 1200° F., the steps of discarding from said regeneration zone catalyst fines having a major portion comprising particle diameters in the range from 0 to 40 microns, cooling said discarded particles to a temperature in the range between 400° to 700° F., recovering said cooled catalyst fines, contacting the recovered catalyst fines at a temperature in the range between 400° F. and 700° F. with hydrogen fluoride, and introducing said contacted fines and hydrogen fluoride into said regeneration zone.

3. In a catalyst regeneration process in which a finely divided catalyst having particle diameters in the range between 0 and 200 microns is circulated from a regeneration zone to a cracking zone and from the cracking zone to the regeneration zone and wherein catalyst is subjected to a hot combustion supporting gas in said regeneration zone at a temperature in the range between 850° and 1200° F., the steps of discarding from said regeneration zone catalyst fines having a major portion comprising particle diameters in the range from 0 to 40 microns, cooling said discarded particles to a temperature in the range between 400° to 700° F., recovering said cooled catalyst fines, contacting the recovered catalyst fines at a temperature in the range between 400° F. and 700° F. with a mixture of a combustion supporting gas and hydrogen fluoride, and introducing said contacted fines and said mixture into said regeneration zone.

4. A process in accordance with claim 3 in which the combustion supporting gas is air.

5. In a catalyst regeneration process in which a finely divided catalyst having particle diameters in the range between 0 and 200 microns is circulated from a regeneration zone to a cracking zone and from the cracking zone to the regeneration zone and wherein catalyst is subjected to a hot combustion supporting gas in said regeneration zone at a temperature in the range between 850° and 1200° F., the steps of discarding catalyst fines from said regeneration zone having a major portion comprising particle diameters in the range from 0 to 40 microns, cooling said discarded particles to a temperature in the range between 400° to 700° F., recovering said cooled catalyst fines, contacting the recovered catalyst fines at a temperature in the range between 400° and 700° F. with a mixture of a combustion supporting gas and hydrogen fluoride, said hydrogen fluoride being employed in an amount in the range between 0.5 and 40 pounds per day per ton of total catalyst in the process, and introducing said contacted fines and said mixture into said regeneration zone.

6. In a catalyst regeneration process in which a finely divided catalyst having particle diameters in the range between 0 and 200 microns is circulated from a regeneration zone to a cracking zone and from the cracking zone to the regeneration zone and wherein catalyst is subjected to a hot combustion supporting gas at a temperature no greater than 1200° F. in said regeneration zone and catalyst fines having a major portion comprising particle diameters in the range from 0 to 40 microns is discarded from said regeneration zone, the steps of recovering said catalyst fines, contacting said recovered catalyst fines at a temperature in the range between 400° to 700° F. with hydrogen fluoride, introducing said contacted catalyst fines and hydrogen fluoride into said regeneration zone and recycling catalyst including said contacted fines from the regeneration zone to the cracking zone.

7. In a catalyst regeneration process in which a finely divided catalyst having particle diameters in the range between 0 and 200 microns is circulated from a regeneration zone to a cracking zone and from the cracking zone to the regeneration zone and wherein catalyst is subjected to a hot combustion gas in said regeneration zone at a temperature in the range between 850° and 1200° F., the steps of discharging from said regeneration zone products of combustion and particles of catalyst having a major portion comprising particles with diameters in the range from 0 to 40 microns, cooling said products of combustion and said withdrawn catalyst particles to a temperature in the range between 400° and 700° F., separating products of combustion from said cooled catalyst particles, contacting said separated catalyst particles with a mixture of a combustion supporting gas and hydrogen fluoride at a temperature in the range between 400° and 700° F., introducing said contacted catalyst particles and said mixture into said regeneration zone and recycling catalyst including said contacted particles from said regeneration zone to said cracking zone.

8. A process in accordance with claim 7 in which the combustion supporting gas is air.

9. A process in accordance with claim 8 in which the hydrogen fluoride is employed in an amount in the range between 0.5 and 40 pounds per day per ton of total catalyst in the process.

HAMPTON G. CORNEIL.

REFERENCES CITED

The following references are of record in the file of this patent:

UNITED STATES PATENTS

| Number | Name | Date |
|---|---|---|
| 1,678,627 | Jaeger | July 24, 1928 |
| 2,415,716 | Veltman | Feb. 11, 1947 |
| 2,420,049 | Martin | May 6, 1947 |
| 2,488,718 | Forrester | Nov. 22, 1949 |
| 2,488,744 | Snyder | Nov. 22, 1949 |